(12) United States Patent
Namizaki

(10) Patent No.: US 9,871,374 B2
(45) Date of Patent: *Jan. 16, 2018

(54) PROTECTING CIRCUIT AND INTEGRATED CIRCUIT

(71) Applicant: Cypress Semiconductor Corporation, San Jose, CA (US)

(72) Inventor: Takashi Namizaki, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,827

(22) Filed: Oct. 10, 2016

(65) Prior Publication Data

US 2017/0098933 A1 Apr. 6, 2017

Related U.S. Application Data

(63) Continuation of application No. 14/536,015, filed on Nov. 7, 2014, now Pat. No. 9,472,947.

(51) Int. Cl.
*H02H 9/04* (2006.01)
(52) U.S. Cl.
CPC ..................... *H02H 9/04* (2013.01)
(58) Field of Classification Search
CPC ................... H02H 9/04; H02H 9/041
USPC ........................................... 361/56
See application file for complete search history.

(56) References Cited

U.S. PATENT DOCUMENTS 9,472,947 B2   10/2016  Namizaki
2011/0304940 A1*  12/2011  Cao .................. H01L 23/60
                                             361/56

OTHER PUBLICATIONS

USPTO Non-Final Rejection for U.S. Appl. No. 14/536,015, dated Mar. 9, 2013; 7 pages.
USPTO Notice of Allowance for U.S. Appl. No. 14/536,015, dated Jun. 14, 2016; 7 pages.

* cited by examiner

*Primary Examiner* — Dharti Patel

(57) ABSTRACT

A protecting circuit includes: a discharge switch configured to connect to a first terminal and a second terminal; a trigger circuit comprising load devices configured to be connected in series between the first terminal and the second terminal, each of the load devices being configured to consume power; and a shunt circuit comprising, between the trigger circuit and the first terminal or the second terminal, at least one shunt pathway configured to be capable of bypassing at least one of the load devices. The trigger circuit is configured to turn on the discharge switch when a voltage between the first terminal and the second terminal is higher than a first voltage value, and the shunt circuit is configured to electrically connect the shunt pathway when the voltage is higher than a second voltage value that is greater than the first voltage value.

20 Claims, 10 Drawing Sheets

PROTECTING CIRCUIT AND INTEGRATED CIRCUIT

CROSS-REFERENCE TO RELATED APPLICATIONS

This application is a Continuation of U.S. patent application Ser. No. 14/536,015 filed Nov. 7, 2014, which is incorporated by reference herein in its entirety.

BACKGROUND

Integrated circuits that provide protection against high voltage, such as electrostatic discharge, for example, are generally configured so that at least one of transistors making up a voltage-dividing resistance in the protecting circuit is short-circuited in response to abnormal high voltage applied between power-supply conductors (as in, for example, Japanese Patent Application JP-H07-321628 A). This integrated circuit provides a hysteresis effect to current flowing through the protecting circuit with respect to the voltage applied.

To protect a circuit (hereinafter called a protected circuit) against high voltage, a protecting circuit may be required to discharge a predetermined value of current between the power supply voltage supplied to the protected circuit and breakdown voltage of the protected circuit when the high voltage is applied thereto.

Recently, the difference between the power supply voltage and the breakdown voltage of a protected circuit tends to decrease. However, when a difference in voltage between the power supply voltage and the breakdown voltage of a protected circuit is small, this may lead to difficulty in discharging a predetermined value of current when high voltage is applied thereto.

SUMMARY

Provided herein are protecting circuit and an integrated circuit embodiments, and/or combinations and sub-combinations thereof, which are capable of discharging a predetermined value of current even when a difference in voltage between the power supply voltage and the breakdown voltage of a protected circuit is small.

An embodiment includes a protecting circuit comprising a discharge switch configured to connect to a first terminal and a second terminal; a trigger circuit including load devices configured to be connected in series between the first terminal and the second terminal, each of the load devices being configured to consume power; and a shunt circuit including, between the trigger circuit and the first terminal or the second terminal, at least one shunt pathway configured to be capable of bypassing at least one of the load devices. The trigger circuit is configured to turn on the discharge switch when a voltage between the first terminal and the second terminal is higher than a first voltage value. The shunt circuit is configured to electrically connect the shunt pathway when the voltage is higher than a second voltage value that is greater than the first voltage value.

Another embodiment includes an integrated circuit comprising a protected circuit configured to connect to a first terminal and a second terminal; and a protecting circuit. The protecting circuit includes: a discharge switch configured to connect to the first terminal and the second terminal; a trigger circuit comprising load devices configured to be connected in series between the first terminal and the second terminal, each of the load devices being configured to consume power; and a shunt circuit including, between the trigger circuit and the first terminal or the second terminal, at least one shunt pathway configured to be capable of bypassing at least one of the load devices. The trigger circuit is configured to turn on the discharge switch when a voltage between the first terminal and the second terminal is higher than a first voltage value, and the shunt circuit is configured to electrically connect the shunt pathway when the voltage is higher than a second voltage value that is greater than the first voltage value.

In the embodiments presented herein, the terms "part", "device" and "system" not only mean physical mechanisms, but also include realization of functions that the "part", "device" and "system" have, by software. The function that one "part", "device" or "system" has may be realized by two or more physical mechanisms or devices. Alternatively, the two or more functions of "part", "device" and "system" may be realized by one physical mechanism or device.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

First Embodiment

Figure 1:
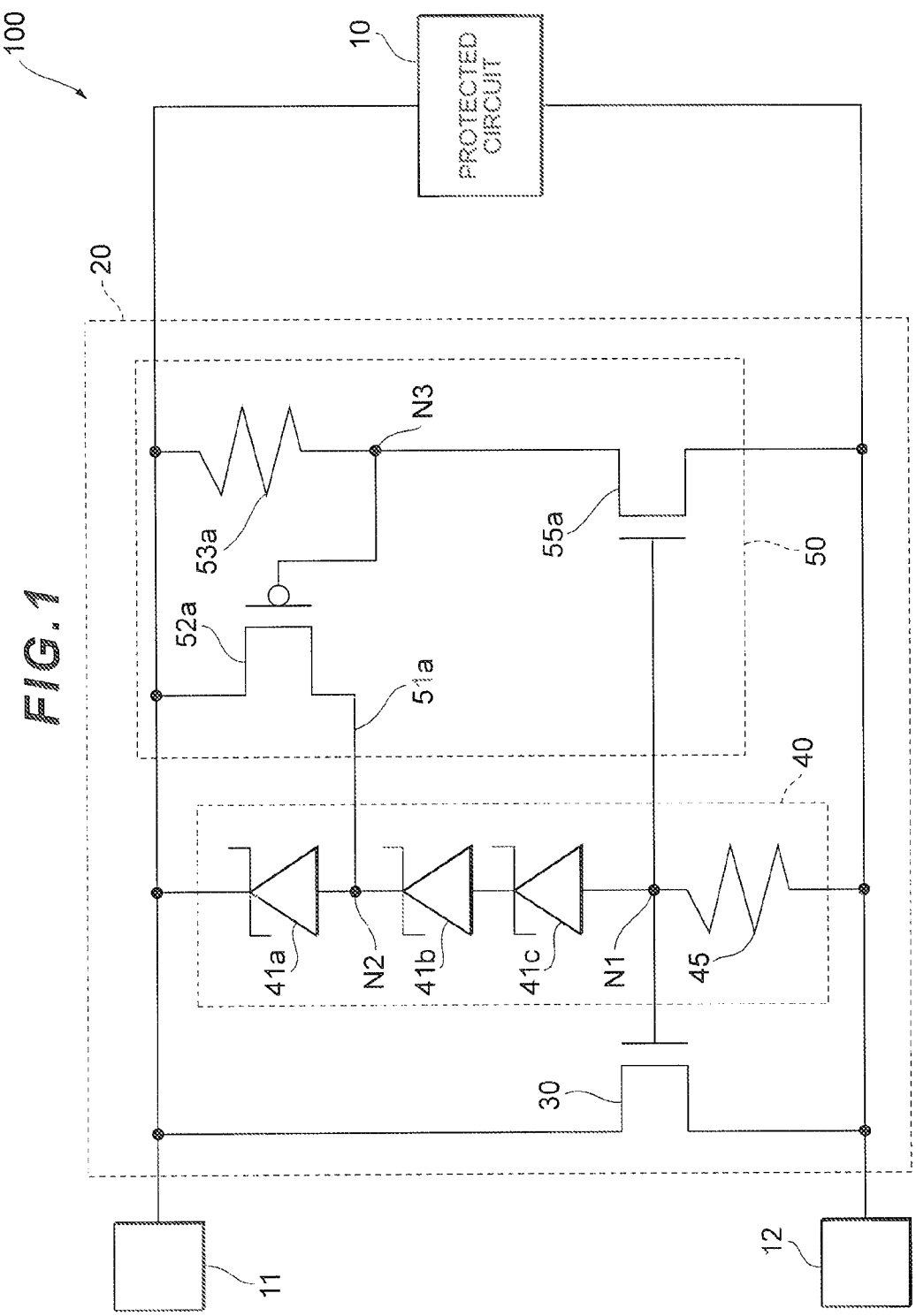
FIG. 1 is a circuit diagram illustrating an example integrated circuit according to a first embodiment.

FIGS. 1 to 7 describe a first embodiment. FIG. 1 is a circuit diagram illustrating an example integrated circuit 100 according to a first embodiment. The integrated circuit 100 is a semiconductor integrated circuit, which can mainly include, for example, semiconductor devices. As illustrated in FIG. 1, the integrated circuit 100 includes a protected circuit 10 and a protecting circuit 20.

The protected circuit 10 is a main unit that implements a function of the integrated circuit 100, for example. The protected circuit 10 may be configured including a plurality of semiconductor devices, for example. The protected circuit 10 is connected to a first terminal 11 and a second terminal 12. The protected circuit 10 receives predetermined power supply voltage Vps from a power supply (not illustrated) via the first terminal 11 and the second terminal 12. The protected circuit 10 is configured to operate at an operation voltage Vop that is lower than or equal to the power supply voltage Vps (0<Vop≤Vps). If breakdown voltage Vbd that is higher than the power supply voltage Vps is applied to the protected circuit 10 (Vbd>Vps), the protected circuit may be broken by the voltage applied.

The protecting circuit 20 protects the protected circuit 10 against high voltage such as electrostatic discharge (hereinafter called "ESD"). That is, the protecting circuit 20 is configured so as to, when voltage higher than the power supply voltage Vps is input between the first terminal 11 and the second terminal 12, discharge predetermined current to prevent the breakdown voltage Vbd from being applied to the protected circuit 10. On the other hand, the protecting circuit 20 is configured so as not to discharge current when voltage lower than or equal to the power supply voltage Vps is input between the first terminal 11 and the second terminal 12, and supplies the voltage to the protected circuit 10. That is, the protecting circuit 20 is configured to discharge target current Ita that is determined based on the specifications in the range of the voltage that is higher than the power supply voltage Vps of the protected circuit 10 and lower than the breakdown voltage Vbd of the protected circuit 10. The protecting circuit 20 includes a discharge switch 30, a trigger circuit 40, and a shunt circuit 50, for example.

The discharge switch 30 is connected to the first terminal 11 and the second terminal 12. The discharge switch 30 is an n-channel type MOSFET, for example, whose drain is connected to the first terminal 11 and source is connected to the second terminal 12. The gate of the discharge switch 30 is connected to the trigger circuit 40.

The trigger circuit 40 is disposed between the first terminal 11 and the second terminal 12. The trigger circuit 40 is configured to turn on or off the discharge switch 30. The trigger circuit 40 includes three load devices 41a-41c and a resistor 45, for example.

The load devices 41a-41c are connected in series between the first terminal 11 and the second terminal 12. The load devices 41a-41c are disposed between the first terminal 11 and the resistor 45. Each of the load devices 41a-41c is configured to consume power.

Each of the load devices 41a-41c preferably includes an active device such as a diode or a transistor. This allows each load device 41a-41c to change their power consumption amount based on the voltage applied thereto, for example. Each voltage drop device 41a-41c may be a zener diode, for example, whose cathode is disposed on the first terminal 11 side and anode is disposed on the resistor 45 side.

The resistor 45 is disposed between the load devices 41a-41c and the second terminal 12. The resistor 45 has one end connected to a node N1 and the other end connected to the second terminal 12. The node N1 is connected to the gate of the discharge switch 30. That is, the resistor 45 functions as a resistor between the gate and the source of the discharge switch 30.

The shunt circuit 50 is disposed between the first terminal 11 and the second terminal 12. The shunt circuit 50 includes a shunt pathway 51a, a shunt switch 52a, a resistor 53a, and a discharge detection switch 55a, for example.

The shunt pathway 51a is configured to enable bypass of at least one of the load devices 41a-41c in the trigger circuit 40. The shunt pathway 51a has one end connected to the first terminal 11, for example, and the other end connected to a node N2 between the load device 41a and the load device 41b, for example. That is, the shunt pathway 51a is a conductor enabling bypass of the load device 41a. In this way, the shunt circuit 50 includes the shunt pathway 51a enabling bypass of the load device 41a, whereby the total amount of load of the load devices 41a-41c can be reduced.

The shunt switch 52a is provided on the shunt pathway 51a. This means that, when the shunt switch 52a is turned on, the shunt pathway 51a can be connected electrically, and when the shunt switch 52a is turned off, the shunt pathway 51a can be disconnected electrically. In this way, the total amount of load of the load devices 41a-41c can be changed easily and reliably.

The shunt switch 52a is a p-channel type MOSFET, for example, whose source is connected to the first terminal 11 and drain is connected to the node N2.

The resistor 53a is disposed between the first terminal 11 and the discharge detection switch 55a. The resistor 53a has one end connected to the first terminal 11 and the other end connected to a node N3. The node N3 is connected to the gate of the shunt switch 52a. That is, the resistor 53a functions as a resistor between the gate and the source of the shunt switch 52a.

The discharge detection switch 55a is disposed between the resistor 53a and the second terminal 12. The discharge detection switch 55a is an n-channel type MOSFET, for example, whose drain is connected to the node N3 and source is connected to the second terminal 12. The gate of the discharge detection switch 55a is connected to the node N1. This means that the resistor 45 of the trigger circuit 40 functions as the resistor between the gate and the source of the discharge detection switch 55a as well.

The following describes the operation of the thus configured protecting circuit 20.

First, the operation of the protecting circuit 20 is described below when the power supply voltage Vps is supplied between the first terminal 11 and the second terminal 12, for example, when the power supply voltage Vps is applied to the first terminal 11 while setting the voltage at the second terminal 12 at the reference voltage.

The trigger circuit 40 is configured to turn off the discharge switch 30 when the voltage between the first terminal 11 and the second terminal 12 is lower than or equal to the power supply voltage Vps. For instance, it may be configured so that the total of threshold voltage of the discharge switch 30 and breakdown voltage of the load devices 41a-41c is higher than the power supply voltage Vps. As a result, the voltage at the node N1 becomes substantially equal to the reference voltage at the second terminal 12 due to the resistor 45. That is, the voltage between the gate and the source of the discharge switch 30 becomes relatively low, and so the discharge switch 30 is turned off.

Similarly, the voltage between the gate and the source of the discharge detection switch 55a in the shunt circuit 50 also becomes relatively low, and so the discharge detection switch 55a is turned off.

Since the discharge switch 30 and the discharge detection switch 55a are switches including transistors, small current actually flows therethrough even when they are in the off state. Such current, however, is very small, and so it can be considered that no current flows when the discharge switch 30 and the discharge detection switch 55a are in the off state.

On the other hand, the voltage at the node N3 becomes substantially equal to the power supply voltage Vps at the first terminal 11 due to the resistor 53a. As a result, relatively high voltage, e.g., voltage higher than the threshold voltage is applied to the gate of the shunt switch 52a, and so the shunt switch 52a is turned off. This means that the shunt pathway 51a is disconnected electrically and so the load device 41a is not bypassed.

In this way, the trigger circuit 40 is configured so that the discharge switch 30 is turned off when the voltage between the first terminal 11 and the second terminal 12 is lower than or equal to the power supply voltage Vps, whereby no current flows through the protecting circuit 20 and so the protecting circuit 20 does not discharge, meaning that voltage lower than or equal to the power supply voltage Vps can be supplied to the protected circuit 10.

Next, the following describes the operation of the protecting circuit 20 when voltage sufficiently higher than the power supply voltage Vps, e.g., voltage due to ESD, is applied between the first terminal 11 and the second terminal 12, for example, when the voltage due to ESD is applied to the first terminal 11 while setting the voltage at the second terminal 12 at the reference voltage.

Figure 2:
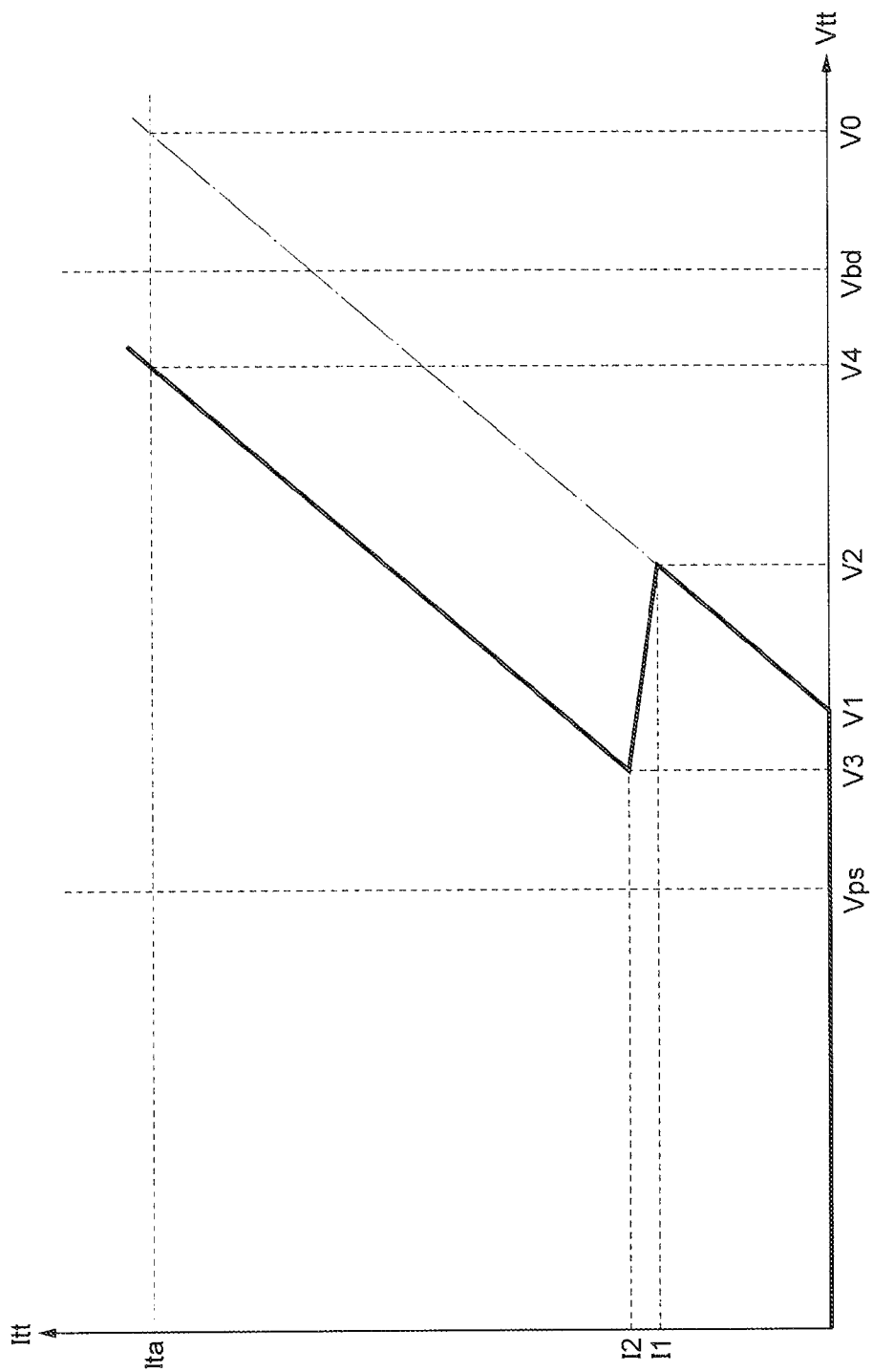
FIG. 2 is a graph illustrating the operation of the example protecting circuit in FIG. 1.

FIG. 2 is a graph illustrating the operation of the example protecting circuit 20 in FIG. 1. In FIG. 2, the horizontal axis represents voltage Vtt (hereinafter called "intra-terminal voltage") between the first terminal 11 and the second terminal 12, and the vertical axis represents current Itt (hereinafter called "intra-terminal current") between the first terminal 11 and the second terminal 12. The intra-terminal current Itt includes current flowing through the protected circuit 10 in addition to the current flowing through the protecting circuit 20. However, when the intra-terminal voltage Vtt is higher than the power supply voltage Vps and is lower than the breakdown voltage Vbd, no current flows through the protected circuit 10 or small current flows therethrough, and so the intra-terminal current Itt can be considered current flowing through the protecting circuit 20.

As illustrated in FIG. 2, the trigger circuit 40 in FIG. 1 is configured to turn on the discharge switch 30 when the intra-terminal voltage Vtt is higher than a first voltage value V1. As described above, it is configured so that the total of threshold voltage of the discharge switch 30 and breakdown voltage of the load devices 41a-41c is higher than the power supply voltage Vps, for example. If the intra-terminal voltage Vtt exceeds the total of the breakdown voltage of the load devices 41a-41c, current flows through the load devices 41a-41c, and so the voltage at the node N1 increases. When the intra-terminal voltage Vtt further increases until the voltage at the node N1 exceeds the threshold voltage of the discharge switch 30, i.e., when the intra-terminal voltage Vtt becomes higher than the first voltage value V1, the discharge switch 30 is turned on. This enables discharge by the flow of the intra-terminal current Itt when the intra-terminal voltage Vtt higher than the power supply voltage Vps of the protected circuit 10 is applied.

When the threshold voltage of the discharge detection switch 55a in FIG. 1 is set to be the same as the threshold voltage of the discharge switch 30, for example, the discharge detection switch 55a also is turned on with turning-on of the discharge switch 30.

Meanwhile, as illustrated in FIG. 2, the shunt circuit 50 in FIG. 1 is configured so as to connect the shunt pathway 51a electrically when the intra-terminal voltage Vtt is higher than a second voltage value V2 that is larger than the first voltage value V1. That is, when the intra-terminal voltage Vtt further increases until the voltage between the first terminal 11 and the node N3 falls below the threshold value of the shunt switch 52a, i.e., when the intra-terminal voltage Vtt becomes higher than the second voltage value V2, the shunt switch 52a is turned on. As a result, current flows through the shunt switch 52a and the shunt pathway 51a is electrically connected.

As illustrated in FIG. 2, the shunt circuit 50 in FIG. 1 may be configured so as to connect the shunt pathway 51a electrically when the intra-terminal voltage Vtt is higher than the second voltage value V2 that is larger than the first voltage value V1 and when the intra-terminal current Itt is larger than a predetermined current value, e.g., a first current value I1. That is, when the intra-terminal voltage Vtt and the intra-terminal current Itt further increase until the voltage between the first terminal 11 and the node N3 falls below the threshold value of the shunt switch 52a, i.e., when the intra-terminal voltage Vtt becomes higher than the second voltage value V2 and when the intra-terminal current Itt becomes larger than the first current value I1, the shunt switch 52a is turned on.

When the shunt pathway 51a is electrically connected, the load device 41a is bypassed, so that the load devices 41a-41c of the trigger circuit 40 are changed from three to two (from three-stage to two-stage). This allows the protecting circuit 20 to let the intra-terminal current Itt flow at voltage V4 that is lower than voltage V0.

Then, as illustrated in FIG. 2, the intra-terminal voltage Vtt increases again after decreasing from the second voltage value V2 to the third voltage value V3. Then when the intra-terminal voltage Vtt reaches the fourth voltage value V4, the intra-terminal current Itt becomes the target current value Ita.

In this way, the shunt circuit 50 is configured so as to connect the shunt pathway 51a electrically when the intra-terminal voltage Vtt is higher than the second voltage value V2 that is larger than the first voltage value V1, whereby the shunt pathway 51a is electrically connected after starting of the discharge by the discharge switch 30, meaning bypass of at least one of the load devices 41a-41c. Then the intra-terminal current Itt is allowed to flow at lower intra-terminal voltage Vtt, and so the intra-terminal current Itt at the target current value Ita can be discharged at the intra-terminal voltage Vtt in the range narrower than that of the conventional configuration.

The second voltage value V2 and the first current value I1 when the shunt switch 52a is turned on as illustrated in FIG. 2, and the third voltage value V3 and the second current value I2 after the shunt switch 52a is turned on can be changed to be a desired value by adjusting the resistance value of the resistor 53a, the channel length and the channel width of the shunt switch 52a or the discharge detection switch 55a, for example.

Figure 3:
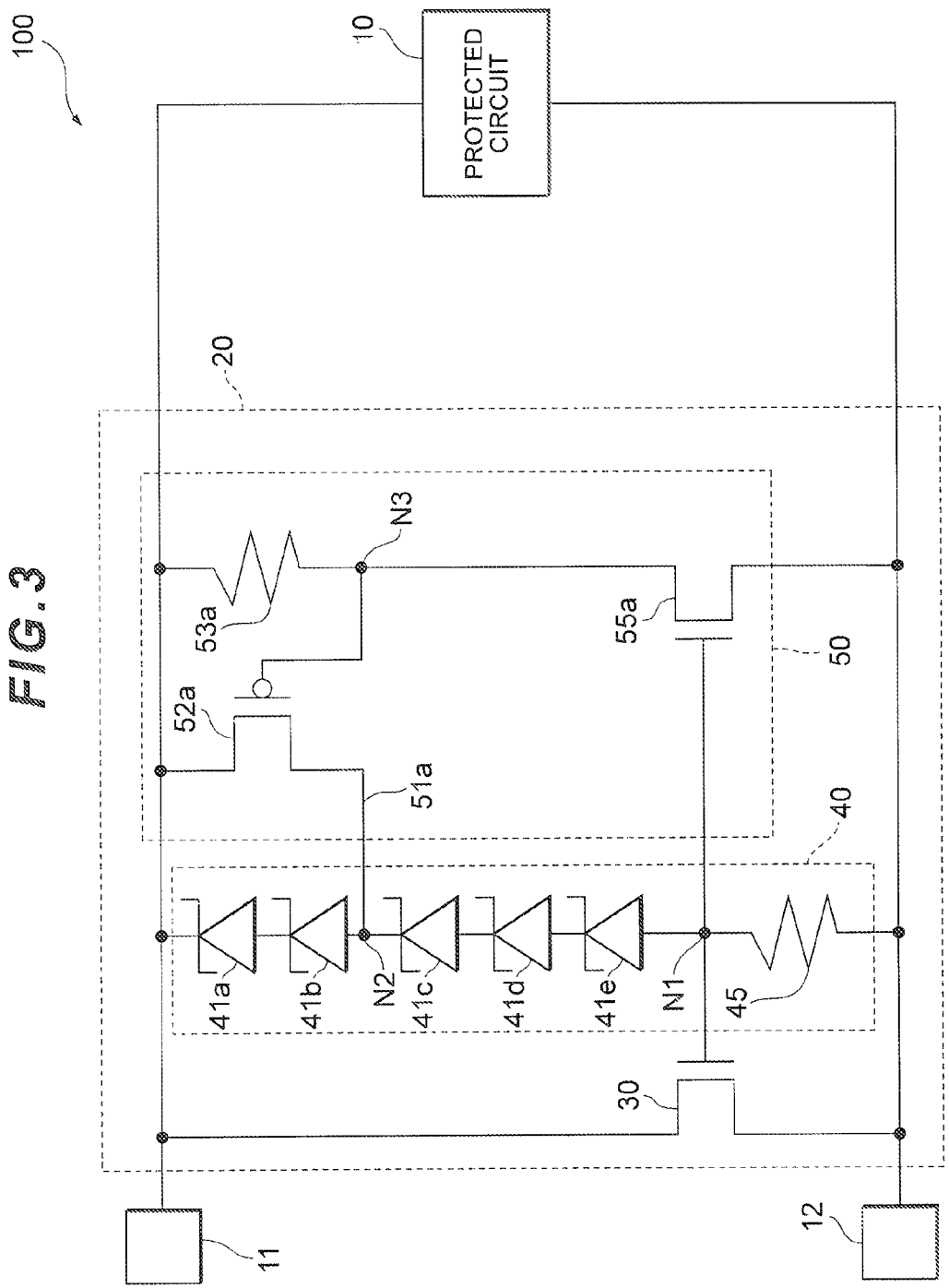
FIG. 3 is a circuit diagram illustrating a second example integrated circuit according to the first embodiment.

FIG. 3 is a circuit diagram illustrating a second example integrated circuit 100 according to the first embodiment. In the integrated circuit 100 in FIG. 3, like or similar reference numerals designate like or similar parts in the integrated circuit 100 of FIG. 1 unless otherwise stated, and their descriptions are omitted as needed. As illustrated in FIG. 3, the trigger circuit 40 includes five load devices 41a-41e, for example, in addition to the resistor 45.

Each of the load devices 41a-41e is configured to consume power. Each load device 41a-41e may be a zener diode, for example, whose cathode is disposed on the first terminal 11 side and anode is disposed on the resistor 45 side.

A shunt pathway 51a has one end connected to the first terminal 11, for example, and the other end connected to the node N2 between the load device 41b and the load device 41c, for example. That is, the shunt pathway 51a is a conductor enabling bypass of the load devices 41a and 41b.

Figure 4:
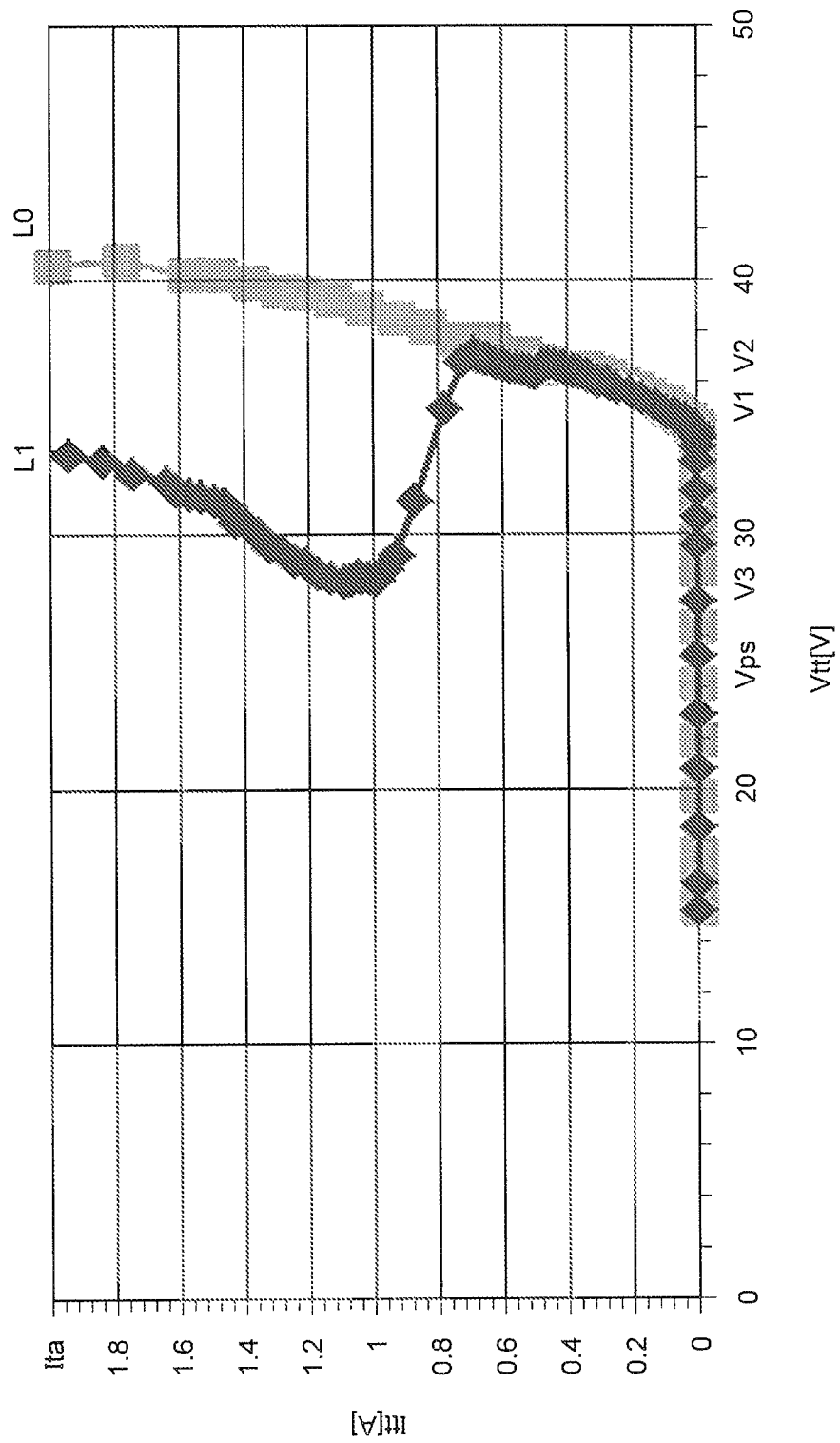
FIG. 4 is a graph showing the comparison of experimental results between a virtual protecting circuit and the example protecting circuit of FIG. 3.

FIG. 4 is a graph showing the comparison of experimental results between in a virtual protecting circuit and in the example protecting circuit 20 of FIG. 3. The virtual protecting circuit (not illustrated) is based on the conventional technique, which includes a discharge switch 30 and a trigger circuit 40 similarly to the protecting circuit 20 of FIG. 3, but does not include the shunt circuit 50 in FIG. 3. In FIG. 4, the horizontal axis represents intra-terminal voltage Vtt, and the vertical axis represents intra-terminal current Itt. Curve L0 indicates the experimental result in the virtual protecting circuit, and curve L1 indicates the experimental result in the protecting circuit 20 of FIG. 3.

When voltage due to ESD, for example, is input between the first terminal 11 and the second terminal 12 in the virtual protecting circuit, the intra-terminal voltage Vtt of curve L0 increases above the power supply voltage Vps of the protected circuit 10 that is set at about 25 volts (V), for example, as illustrated in FIG. 4. When the intra-terminal voltage Vtt of curve L0 exceeds a first voltage value V1 set at about 35 V, for example, the discharge switch 30 is turned ON, enabling discharge, and so the intra-terminal current Itt of curve L0 starts to increase.

When the intra-terminal voltage Vtt and the intra-terminal current Itt continue to increase until the intra-terminal current Itt of curve L0 reaches the target current value Ita that is set at about 2 amperes (A), for example, the intra-terminal voltage Vtt of curve L0 becomes about 41 V. Such a virtual protecting circuit is operable for a circuit to be protected having the power supply voltage Vps of 25 V and the breakdown voltage Vbd of 45 V and enables discharge of the intra-terminal current Itt of the target current value Ita in the range of the intra-terminal voltage Vtt from 25 V to 41 V.

On the other hand, when voltage due to ESD, for example, is input between the first terminal 11 and the second terminal 12 in the protecting circuit 20 of FIG. 3, as illustrated in FIG. 4, and when the intra-terminal voltage Vtt of curve L1 exceeds the first voltage value V1 that is set at about 35 V, for example, the discharge switch 30 in FIG. 3 is turned ON, enabling discharge similarly to curve L0, and so the intra-terminal current Itt of curve L1 starts to increase.

When the intra-terminal voltage Vtt and the intra-terminal current Itt continue to increase until the intra-terminal voltage Vtt of curve L1 exceeds the second voltage value V2 that is set at about 37 V, for example, the shunt switch 52a in FIG. 3 is turned on. At this time, as illustrated in FIG. 4, the intra-terminal current Itt of curve L1 is at about 0.7 A. When the shunt switch 52a includes a transistor, the shunt switch 52a starts to turn on when the intra-terminal voltage Vtt exceeds the second voltage value V2, and turns on completely when the intra-terminal voltage Vtt of curve L1 decreases to a third voltage value V3 that is set at about 28 V, for example. At this time, the intra-terminal current Itt of curve L1 is at about 1.1 A.

When the intra-terminal voltage Vtt and the intra-terminal current Itt continue to increase again until the intra-terminal current Itt of curve L1 reaches the target current value Ita that is set at about 2 A, the intra-terminal voltage Vtt is at about 33 V. The protecting circuit 20 in FIG. 3 is operable for a protected circuit 10 having the power supply voltage Vps of 25 V and the breakdown voltage Vbd of 40 V, for example, and enables discharge of the intra-terminal current Itt of the target current value Ita in the range of the intra-terminal voltage Vtt from 25 V to 37 V that is narrower than that of the virtual protecting circuit.

The present embodiment exemplifies the case in FIGS. 1 and 3 where the gate of the discharge switch 30 and the gate of the discharge detection switch 55a are connected to the node N1 between the load devices 41a-41c or the load devices 41a-41e and the resistor 45, which is not a limiting example. The protecting circuit 20 may be configured so that the shunt pathway 51a is electrically connected after the discharge switch 30 is turned on.

Figure 5:
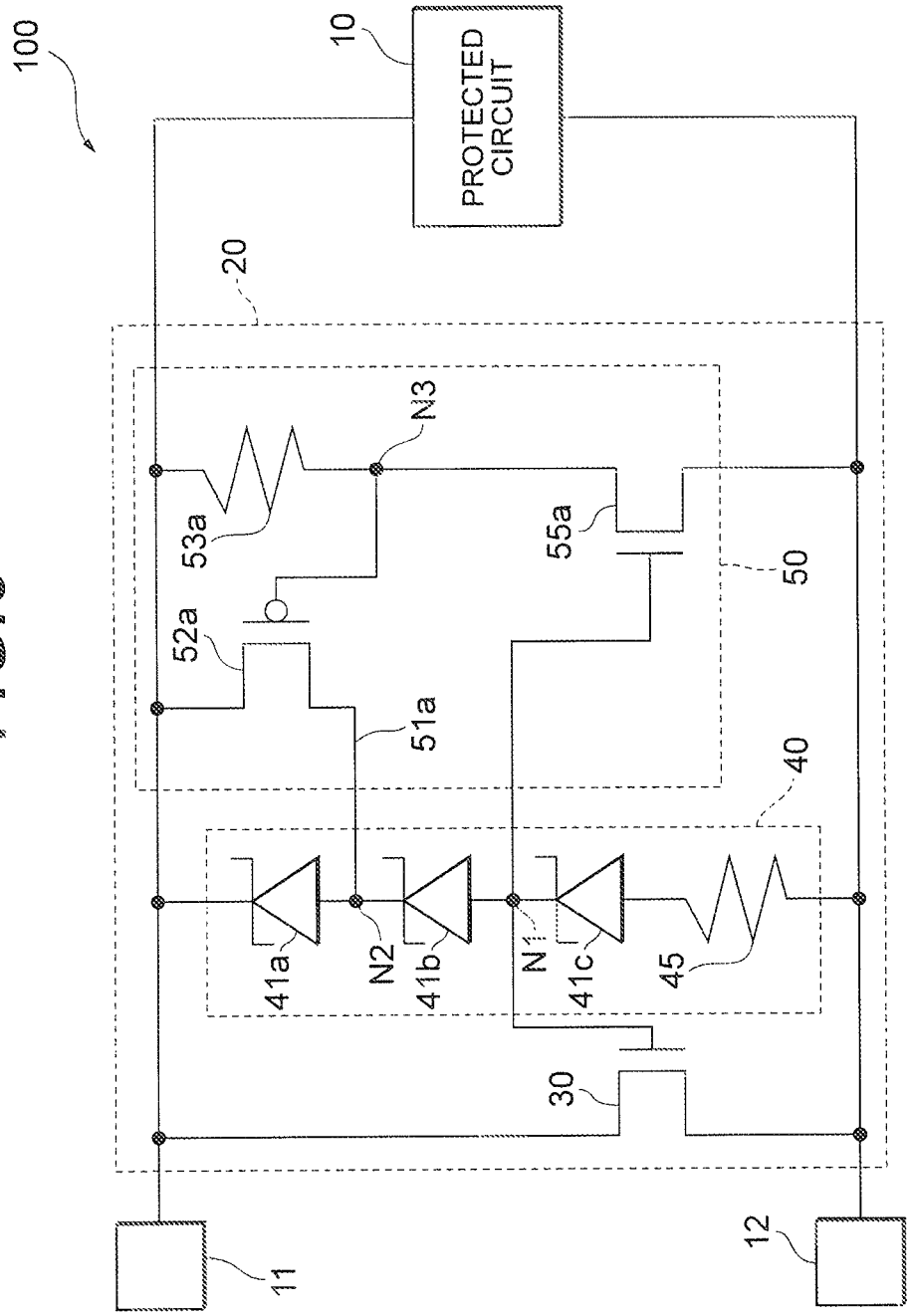
FIG. 5 is a circuit diagram illustrating a third example integrated circuit according to the first embodiment.

FIG. 5 is a circuit diagram illustrating a third example integrated circuit 100 according to the first embodiment. In the integrated circuit 100 in FIG. 5, like or similar reference numerals designate like or similar parts in the integrated circuit 100 of FIG. 1 unless otherwise stated, and their descriptions are omitted as needed. As illustrated in FIG. 5, the gate of the discharge switch 30 is connected to the node N1 between the load device 41b and the load device 41c, for example. The gate of the discharge detection switch 55a is connected to the node N1 similarly to the gate of the discharge switch 30, for example.

The protecting circuit 20 in FIG. 5 is configured so that the discharge detection switch 55a has threshold voltage that is the same as the threshold voltage of the discharge switch 30, for example, whereby the discharge detection switch 55a is turned on in response to turning-on of the discharge switch 30. Adjustment of at least one of the threshold voltage of the shunt switch 52a and the resistance value of the resistor 53a, for example, enables the configuration such that the shunt switch 52a is turned on after the discharge detection switch 55a is turned on and when the intra-terminal voltage Vtt increases to be higher than the second voltage value. That is, the protecting circuit 20 in FIG. 5 can be configured to connect the shunt pathway 51a electrically after the discharge switch 30 is turned on similarly to the examples of FIG. 1 and FIG. 3.

Figure 6:
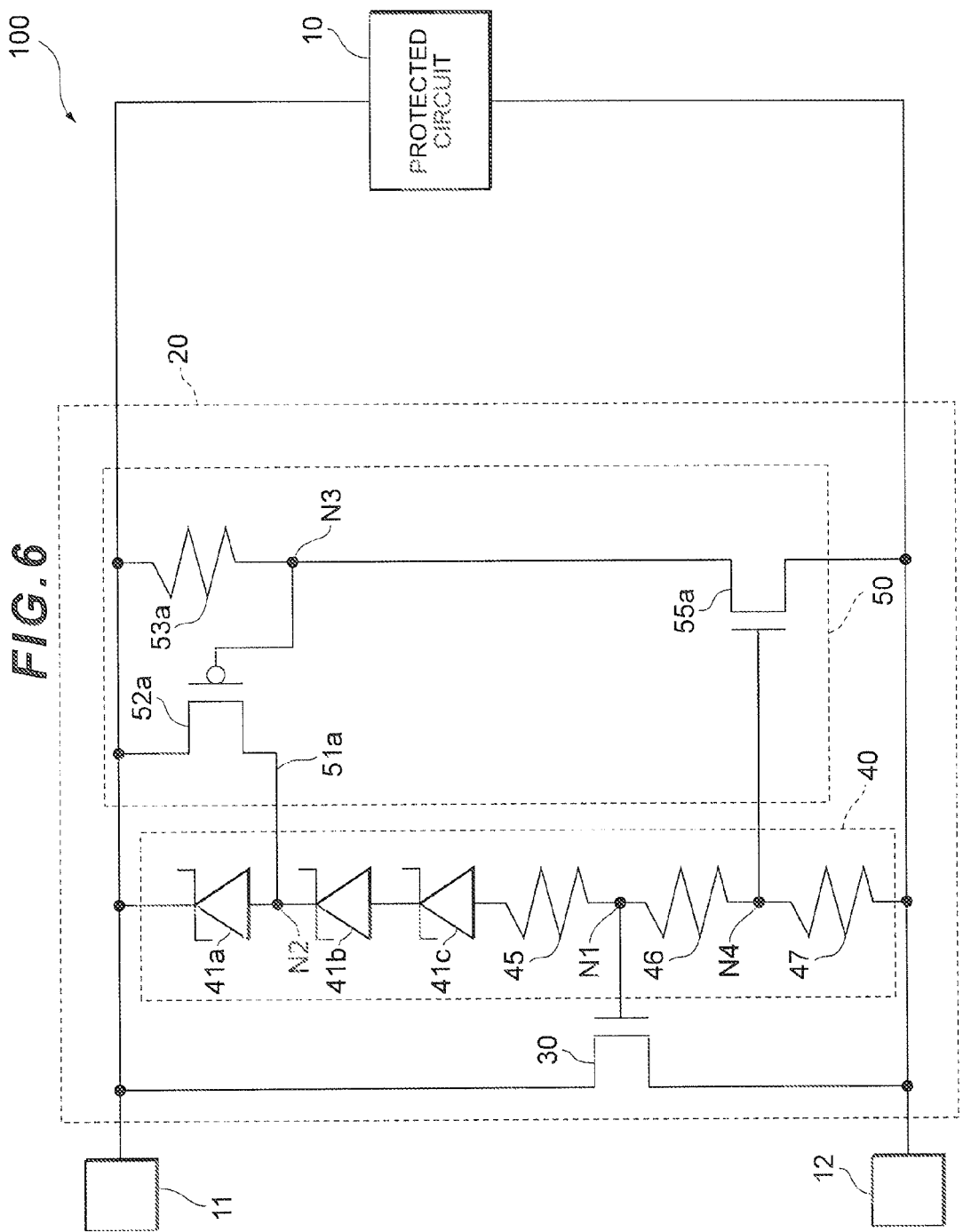
FIG. 6 is a circuit diagram illustrating a fourth example integrated circuit according to the first embodiment.

FIG. 6 is a circuit diagram illustrating a fourth example integrated circuit 100 according to the first embodiment. In the integrated circuit 100 in FIG. 6, like or similar reference numerals designate like or similar parts in the integrated circuit 100 of FIG. 1 unless otherwise stated, and their descriptions are omitted as needed. As illustrated in FIG. 6, the trigger circuit 40 includes three resistors 45-47 in addition to the load devices 41a-41c. The resistors 45-47 are connected in series between the first terminal 11 and the second terminal 12. The gate of the discharge switch 30 is connected to the node N1 between the resistor 45 and the resistor 46, for example. The gate of the discharge detection switch 55a is connected to the node N4 between the resistor 46 and the resistor 47, for example.

The protecting circuit 20 in FIG. 6 can be configured so that the discharge detection switch 55a can be turned on, following turning-on of the discharge switch 30 by adjusting at least one of the resistor 46, the resistor 47, and the threshold voltage of the discharge detection switch 55a, for example. This can be configured so that after the discharge detection switch 55a is turned on, and when the intra-terminal voltage Vtt increases to be higher than the second voltage value V2, the shunt switch 52a can be turned on by adjusting at least one of the threshold voltage of the shunt switch 52a and the resistance value of the resistor 53a. In this way, similarly to the examples of FIGS. 1, 3, and 5, the protecting circuit 20 of FIG. 6 can be configured to connect the shunt pathway 51a electrically after the discharge switch 30 is turned on.

The present embodiment exemplifies the case where the discharge switch 30 is an n-channel type MOSFET, and the load devices 41a-41c and the load devices 41a-41e are zener diodes in FIGS. 1, 3, 5, and 6, which is not a limiting example. They may be configured so that the discharge switch 30 is a switch that is driven by the trigger circuit 40 and the load devices 41a-41c and the load devices 41a-41e of the protecting circuit 20 cause voltage drop.

Figure 7:
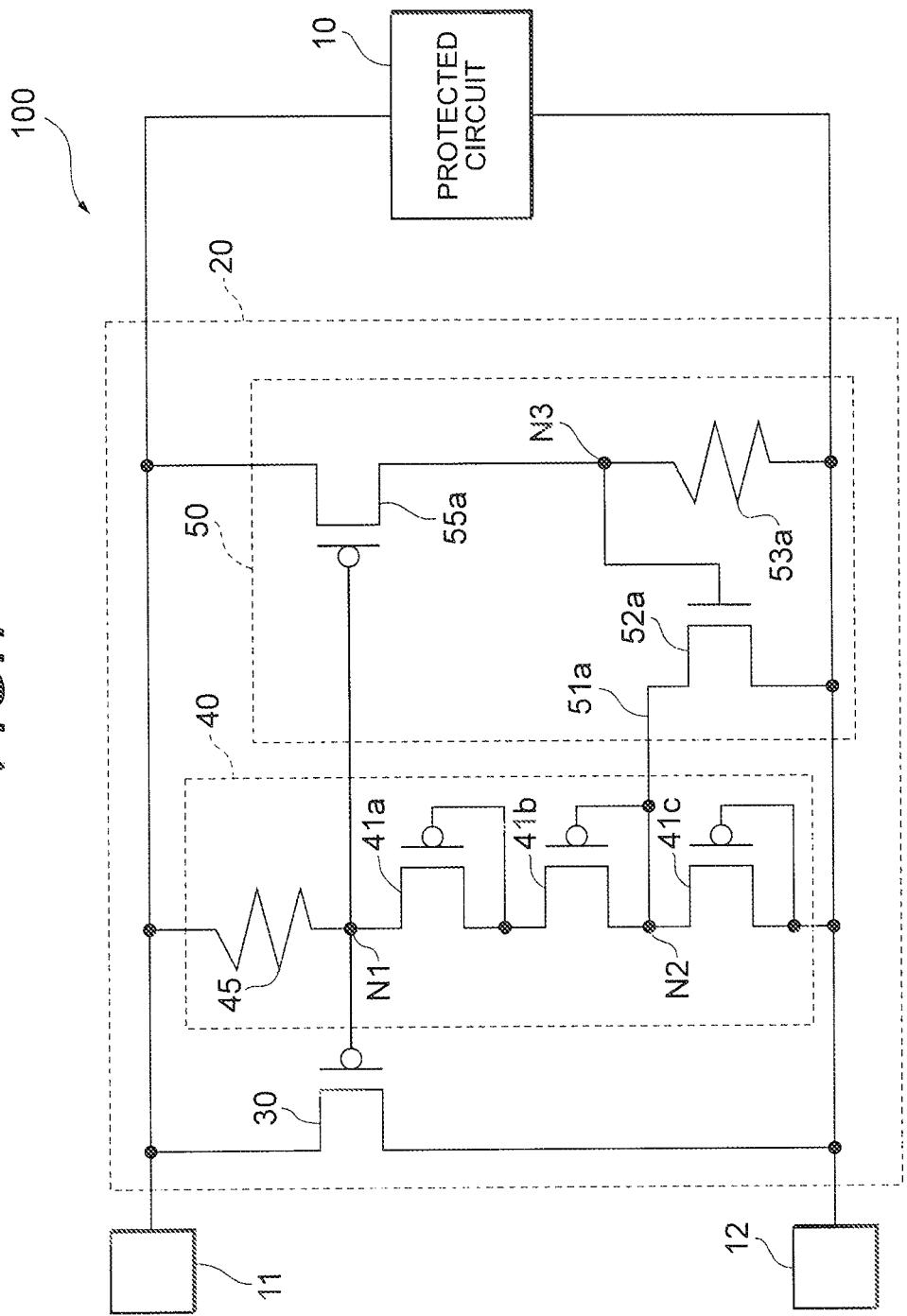
FIG. 7 is a circuit diagram illustrating a fifth example integrated circuit according to the first embodiment.

FIG. 7 is a circuit diagram illustrating a fifth example integrated circuit 100 according to the first embodiment. In the integrated circuit 100 in FIG. 7, like or similar reference numerals designate like or similar parts in the integrated circuit 100 of FIG. 1 unless otherwise stated, and their descriptions are omitted as needed. As illustrated in FIG. 7, the discharge switch 30 is a p-channel type MOSFET, for example, whose source is connected to the first terminal 11 and drain is connected to the second terminal 12. The gate of the discharge switch 30 is connected to the node N1 between the resistor 45 and the load devices 41a-41c.

The resistor 45 is disposed between the first terminal 11 and the load devices 41a-41c. The resistor 45 has one end connected to the first terminal 11 and the other end connected to the node N1.

The load devices 41a-41c are disposed between the resistor 45 and the second terminal 12. Each of the load devices 41a-41c is a p-channel type MOSFET, for example, whose source is disposed on the 45 side and drain is disposed on the second terminal 12 side. The gate of each load device 41a-41c is connected to their drains for short.

The shunt pathway 51a has one end connected to the node N2 between the load device 41b and the load device 41c, for example, and the other end connected to the second terminal 12. That is, the shunt pathway 51a is a conductor enabling bypass of the load device 41c.

The shunt switch 52a is an n-channel type MOSFET, for example, whose drain is connected to the node N2 and source is connected to the second terminal 12.

The resistor 53a is disposed between the discharge detection switch 55a and the second terminal 12. The resistor 53a has one end connected to the node N3 and the other end connected to the second terminal 12. The node N3 is connected to the gate of the shunt switch 52a.

The discharge detection switch 55a is disposed between the first terminal 11 and the resistor 53a. The discharge detection switch 55a is a p-channel type MOSFET, for example, whose source is connected to the first terminal 11 and drain is connected to the node N3. The gate of the discharge detection switch 55a is connected to the node N1.

The protecting circuit 20 in FIG. 7 is configured so that the discharge detection switch 55a has threshold voltage that is the same as the threshold voltage of the discharge switch 30, for example, whereby the discharge detection switch 55a is turned on in response to turning-on of the discharge switch 30. Adjustment of at least one of the threshold voltage of the shunt switch 52a and the resistance value of the resistor 53a, for example, enables the configuration such that the shunt switch 52a is turned on after the discharge detection switch 55a is turned on and when the intra-terminal voltage Vtt increases to be higher than the second voltage value V2. That is, the protecting circuit 20 in FIG. 7 can be configured to connect the shunt pathway 51a electrically after the discharge switch 30 is turned on similarly to the examples of FIGS. 1, 3, 5, and 6.

Although not illustrated, the discharge switch 30 may be an npn-type bipolar transistor or a pnp-type bipolar transistor, for example. Each of the load devices 41a-41c also may be an npn-type bipolar transistor or a pnp-type bipolar transistor, for example.

In this way, the protecting circuit 20 and the integrated circuit 100 of the present embodiment can be configured so that the trigger circuit 40 turns on the discharge switch 30 when the intra-terminal voltage Vtt is higher than the first voltage value V1. This allows the intra-terminal current Itt to flow when the intra-terminal voltage Vtt higher than the power supply voltage Vps of the protected circuit 10 is applied. The shunt circuit 50 includes the shunt pathway 51a enabling bypass of at least one of the load devices 41a-41c between the trigger circuit 40 and the first terminal 11 or the second terminal 12. This can reduce the total amount of loads of the load devices 41a-41c. Then the shunt circuit 50 is configured so as to connect the shunt pathway 51a electrically when the intra-terminal voltage Vtt is higher than the second voltage value V2 that is larger than the first voltage value V1. This allows the shunt pathway 51a to be electrically connected after the discharge by the discharge switch 30 starts, enabling bypass of at least one of the load devices 41a-41c, meaning that the intra-terminal current Itt can flow at lower intra-terminal voltage Vtt, and so the intra-terminal current Itt at the target current value Ita can be discharged in the range of the intra-terminal voltage Vtt that is narrower than that of the conventional configuration. As a result, even when a difference in voltage between the power supply voltage Vps and the breakdown voltage Vbd of the protected circuit 10 is small, the intra-terminal current Itt at the target current value Ita can be discharged reliably.

Second Embodiment

Figure 8:
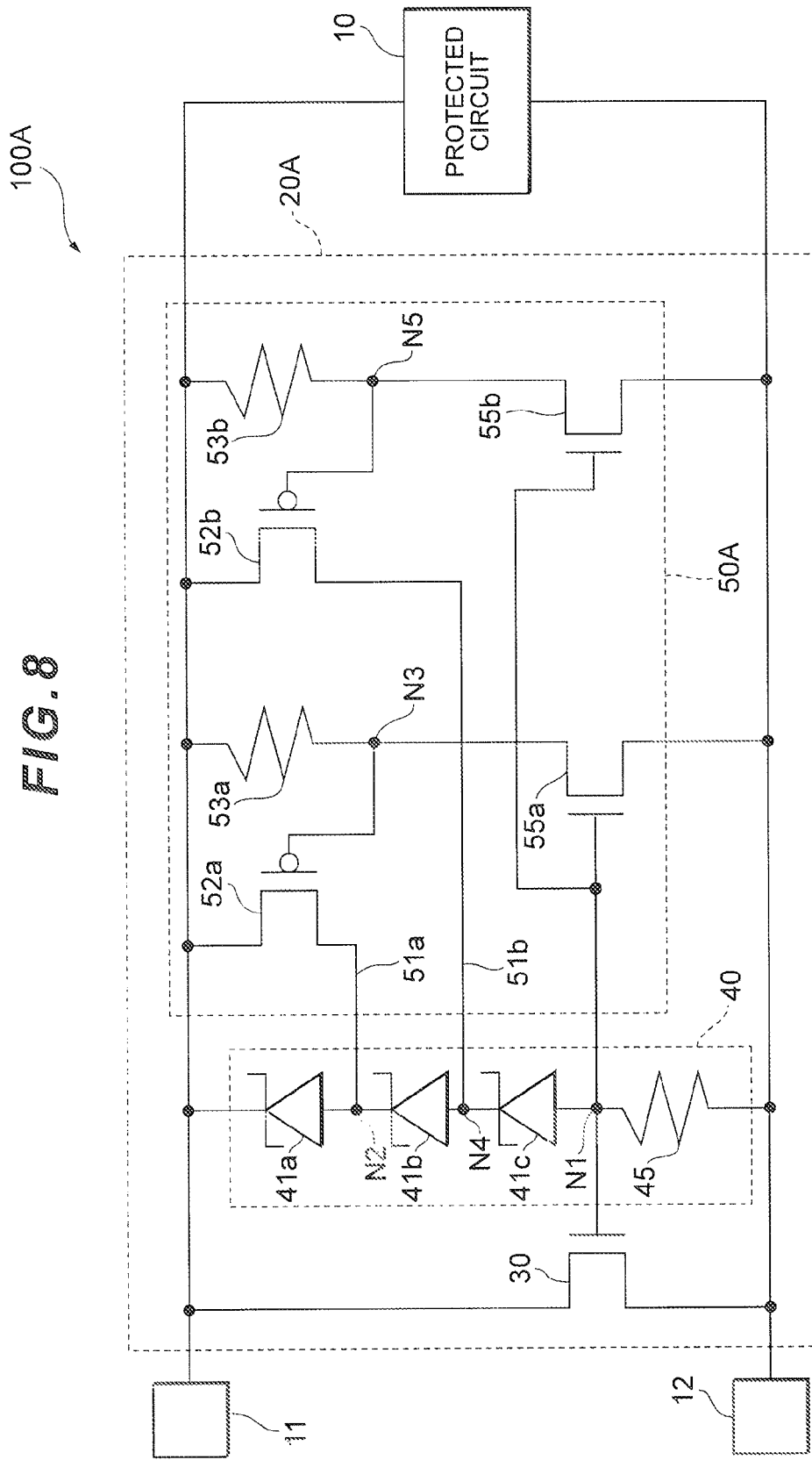
FIG. 8 is a circuit diagram illustrating an example integrated circuit according to a second embodiment.
Figure 9:
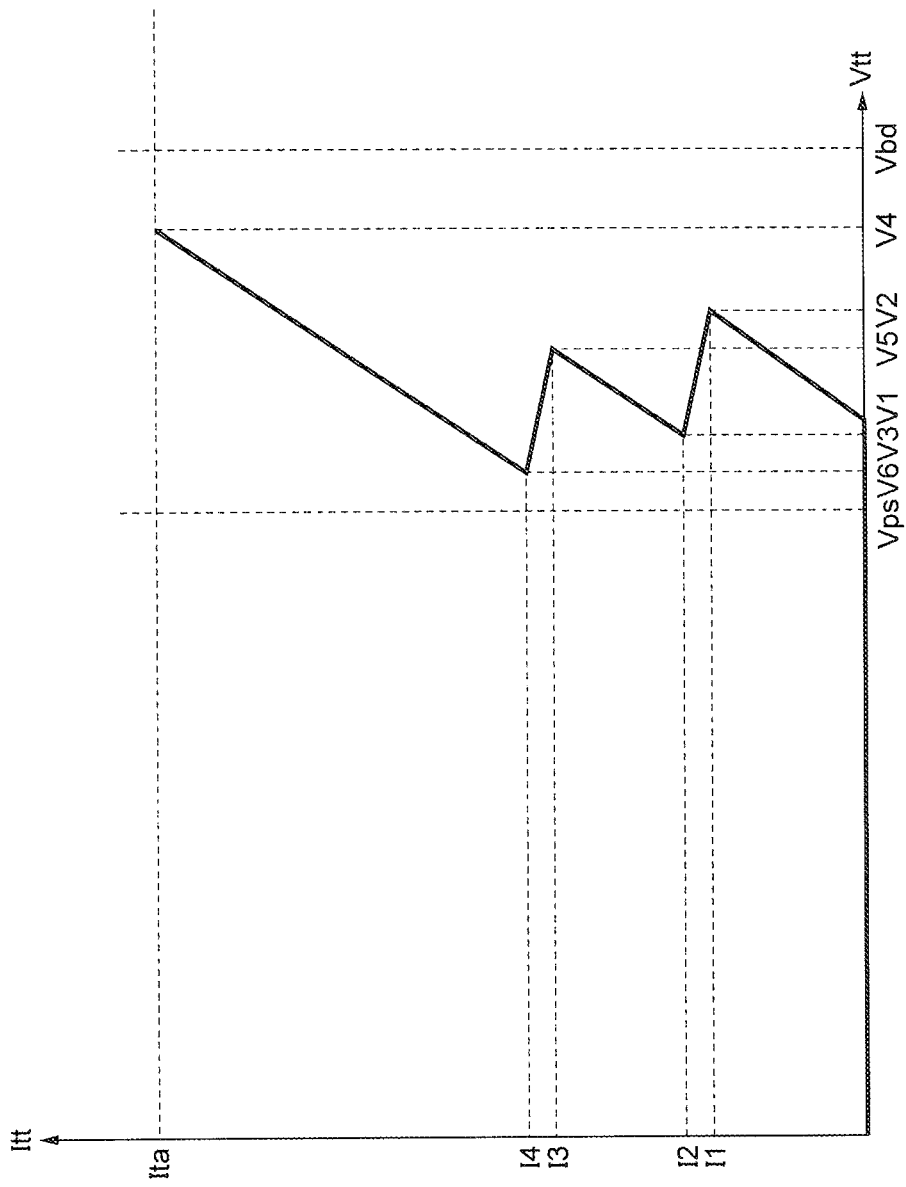
FIG. 9 is a graph illustrating the operation of the example protecting circuit in FIG. 8.
Figure 10:
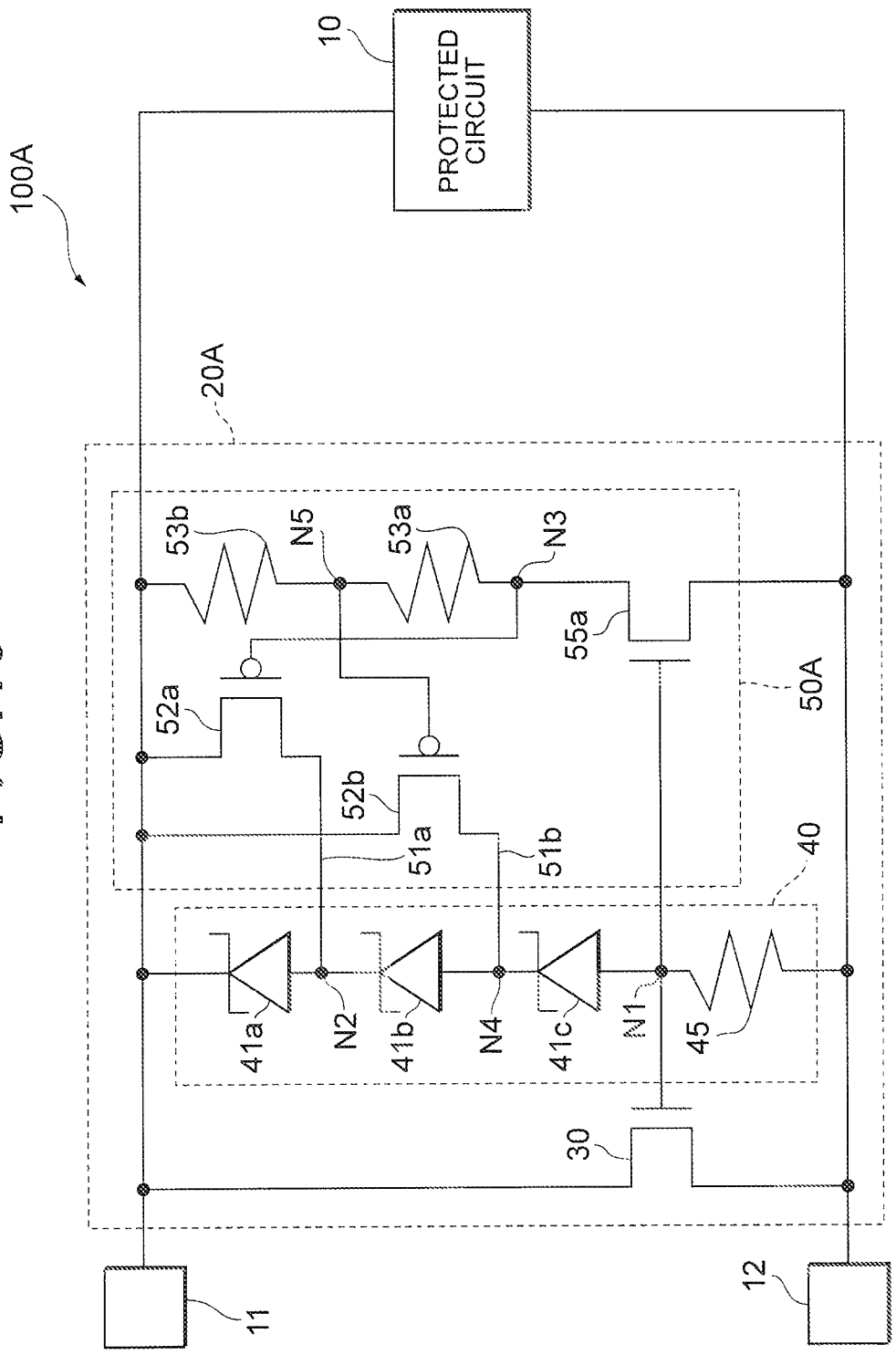
FIG. 10 is a circuit diagram illustrating a second example integrated circuit according to the second embodiment.

FIGS. 8-10 describe a second embodiment. Like reference numerals designate like parts in the first embodiment as stated above unless otherwise stated, and their detailed descriptions are omitted as needed. Then similar reference numerals designate similar parts in the first embodiment, and their detailed descriptions are omitted as needed. The parts and operations not illustrated are similar to those stated in the first embodiment.

FIG. 8 is a circuit diagram illustrating an example integrated circuit 100A according to the second embodiment. The integrated circuit 100A is a semiconductor integrated circuit, which can mainly include, for example, semiconductor devices. As illustrated in FIG. 8, the integrated circuit 100A includes a protected circuit 10 and a protecting circuit 20A.

The protecting circuit 20A protects the protected circuit 10 against high voltage such as ESD. That is, the protecting circuit 20A is configured so as to, when voltage higher than the power supply voltage Vps is input between the first terminal 11 and the second terminal 12, discharge predetermined current to prevent the breakdown voltage Vbd from being applied to the protected circuit 10. On the other hand, the protecting circuit 20A is configured so as not to discharge current when voltage lower than or equal to the power supply voltage Vps is input between the first terminal 11 and the second terminal 12, and supplies the voltage to the protected circuit 10. That is, the protecting circuit 20A is configured to discharge target current Ita that is determined based on the specifications in the range of the voltage that is higher than the power supply voltage Vps of the protected circuit 10 and lower than the breakdown voltage Vbd of the protected circuit 10. The protecting circuit 20A includes a discharge switch 30, a trigger circuit 40 and a shunt circuit 50A, for example.

The shunt circuit 50A is disposed between the first terminal 11 and the second terminal 12. The shunt circuit 50A includes a shunt pathway M a and a shunt pathway 51b, a shunt switch 52a and a shunt switch 52b, a resistor 53a and a resistor 53b, and a discharge detection switch 55a and a discharge detection switch 55b.

Each of the shunt pathway 51a and the shunt pathway 51b is configured to enable bypass of at least one of the load devices 41a-41c in the trigger circuit 40. The shunt pathway 51a has one end connected to the first terminal 11, for example, and the other end connected to the node N2 between the load device 41a and the load device 41b, for example. That is, the shunt pathway 51a is a conductor enabling bypass of the load device 41a. The shunt pathway 51b has one end connected to the first terminal 11, for example, and the other end connected to the node N4 between the load device 41b and the load device 41c, for example. That is, the shunt pathway 51b is a conductor enabling bypass of the load device 41a and the load device 41b. In this way, the shunt circuit 50A includes the shunt pathway 51a enabling bypass of the load device 41a and the shunt pathway 51b enabling bypass of the load devices 41a and 41b, whereby the total amount of load of the load devices 41a-41c can be reduced with two stages.

The shunt switch 52a is provided on the shunt pathway 51a. This means that, when the shunt switch 52a is turned on, the shunt pathway 51a can be connected electrically, and when the shunt switch 52a is turned off, the shunt pathway 51a can be disconnected electrically.

The shunt switch 52a is a p-channel type MOSFET, for example, whose source is connected to the first terminal 11 and drain is connected to the node N2.

The shunt switch 52b is provided on the shunt pathway 51b. This means that, when the shunt switch 52b is turned on, the shunt pathway 51b can be connected electrically, and when the shunt switch 52b is turned off, the shunt pathway 51b can be disconnected electrically. In this way, the total amount of load of the load devices 41a-41c can be changed easily and reliably.

The shunt switch 52b is a p-channel type MOSFET, for example, whose source is connected to the first terminal 11 and drain is connected to the node N4.

The resistor 53a is disposed between the first terminal 11 and the discharge detection switch 55a. The resistor 53a has one end connected to the first terminal 11 and the other end connected to the node N3. The node N3 is connected to the gate of the shunt switch 52a. That is, the resistor 53a functions as a resistor between the gate and the source of the shunt switch 52a.

The resistor 53b is disposed between the first terminal 11 and the discharge detection switch 55b. The resistor 53b has one end connected to the first terminal 11 and the other end connected to the node N5. The node N5 is connected to the gate of the shunt switch 52b. That is, the resistor 53b functions as a resistor between the gate and the source of the shunt switch 52b.

The discharge detection switch 55a is disposed between the resistor 53a and the second terminal 12. The discharge detection switch 55a is an n-channel type MOSFET, for example, whose drain is connected to the node N3 and source is connected to the second terminal 12. The gate of the discharge detection switch 55a is connected to the node N1. This means that the resistor 45 of the trigger circuit 40 functions as the resistor between the gate and the source of the discharge detection switch 55a as well.

The discharge detection switch 55b is disposed between the resistor 53b and the second terminal 12. The discharge detection switch 55b is an n-channel type MOSFET, for example, whose drain is connected to the node N5 and source is connected to the second terminal 12. The gate of the discharge detection switch 55b is connected to the node N1. This means that the resistor 45 of the trigger circuit 40 functions as the resistor between the gate and the source of the discharge detection switch 55b as well.

The following describes the operation of the thus configured protecting circuit 20A. When the power supply voltage Vps is supplied between the first terminal 11 and the second terminal 12, the protecting circuit 20A operates similarly to the protecting circuit 20 of Embodiment 1, and so their descriptions are omitted.

FIG. 9 is a graph illustrating the operation of the example protecting circuit 20A in FIG. 8. In FIG. 9, the horizontal axis represents intra-terminal voltage Vtt, and the vertical axis represents intra-terminal current Itt.

The trigger circuit 40 in FIG. 8 is configured so that the total of threshold voltage of the discharge switch 30 and breakdown voltage of the load devices 41a-41c is higher than the power supply voltage Vps, for example. If the intra-terminal voltage Vtt exceeds the total of the breakdown voltage of the load devices 41a-41c, current flows through the load devices 41a-41c, and so the voltage at the node N1 increases. When the intra-terminal voltage Vtt further increases until the voltage at the node N1 exceeds the threshold voltage of the discharge switch 30, i.e., when the intra-terminal voltage Vtt becomes higher than the first voltage value V1 as illustrated in FIG. 9, the discharge switch 30 is turned on. This enables discharge by the flow of the intra-terminal current Itt when the intra-terminal voltage Vtt higher than the power supply voltage Vps of the protected circuit 10 is applied.

When the threshold voltage of the discharge detection switch 55a and the threshold voltage of the discharge detection switch 55b in FIG. 8 are set to be the same as the threshold voltage of the discharge switch 30, for example, the discharge detection switch 55a and the discharge detection switch 55b also are turned on with turning-on of the discharge switch 30.

As illustrated in FIG. 9, the shunt circuit 50A in FIG. 8 is configured so as to connect the shunt pathway 51a electrically when the intra-terminal voltage Vtt is higher than the second voltage value V2 that is larger than the first voltage value V1. That is, when the intra-terminal voltage Vtt further increases until the voltage between the first terminal 11 and the node N3 falls below the threshold value of the shunt switch 52a, i.e., when the intra-terminal voltage Vtt becomes higher than the second voltage value V2, the shunt switch 52a is turned on. As a result, current flows through the shunt switch 52a and the shunt pathway 51a is electrically connected.

As illustrated in FIG. 9, the shunt circuit 50A in FIG. 8 may be configured so as to connect the shunt pathway 51a electrically when the intra-terminal voltage Vtt is higher than the second voltage value V2 that is larger than the first voltage value V1 and when the intra-terminal current Itt is larger than a predetermined current value, e.g., a first current value I1, for example. That is, when the intra-terminal voltage Vtt and the intra-terminal current Itt further increase until the voltage between the first terminal 11 and the node N3 falls below the threshold value of the shunt switch 52a, i.e., when the intra-terminal voltage Vtt becomes higher than the second voltage value V2 and the intra-terminal current Itt becomes larger than the first current value I1, the shunt switch 52a is turned on.

When the shunt pathway 51a is electrically connected, the load device 41a is bypassed, so that the load devices 41a-41c of the trigger circuit 40 are changed from three to two (from three-stage to two-stage). This allows the protecting circuit 20A to let the intra-terminal current Itt flow at lower voltage.

Then, as illustrated in FIG. 9, the intra-terminal voltage Vtt increases again after decreasing from the second voltage value V2 to the third voltage value V3.

As illustrated in FIG. 9, the shunt circuit 50A in FIG. 8 is configured so as to connect the shunt pathway 51b electrically when the intra-terminal voltage Vtt increases from the third voltage value V3 to be higher than a fifth voltage value V5. That is, when the intra-terminal voltage Vtt further increases until the voltage between the first terminal 11 and the node N5 falls below the threshold value of the shunt switch 52b, i.e., when the intra-terminal voltage Vtt becomes higher than the fifth voltage value V5, the shunt switch 52b is turned on. As a result, current flows through the shunt switch 52b and the shunt pathway 51b is electrically connected.

As illustrated in FIG. 9, the shunt circuit 50A in FIG. 8 may be configured so as to connect the shunt pathway 51b electrically when the intra-terminal voltage Vtt is higher than the fifth voltage value V5 and when the intra-terminal current Itt is larger than a predetermined current value, e.g., a third current value I3, for example. That is, when the intra-terminal voltage Vtt and the intra-terminal current Itt further increase until the voltage between the first terminal 11 and the node N5 falls below the threshold value of the shunt switch 52b, i.e., when the intra-terminal voltage Vtt becomes higher than the fifth voltage value V5 and the intra-terminal current Itt becomes larger than the third current value I3, the shunt switch 52b is turned on.

When the shunt pathway 51b is electrically connected, the load device 41a and the load device 41b are bypassed, so that the load devices 41a-41c of the trigger circuit 40 are changed from two to one (from two-stage to one-stage). This allows the protecting circuit 20A to let the intra-terminal current Itt flow at lower voltage.

Then, as illustrated in FIG. 9, the intra-terminal voltage Vtt increases again after decreasing from the fifth voltage value V5 to the sixth voltage value V6. When the intra-terminal voltage Vtt reaches the fourth voltage value V4, the intra-terminal current Itt becomes the target current value Ita.

In this way, the shunt circuit 50A is configured so as to connect the shunt pathway 51a electrically when the intra-terminal voltage Vtt is higher than the second voltage value V2 that is larger than the first voltage value V1, and to connect the shunt pathway 51b electrically when the intra-terminal voltage Vtt is higher than the fifth voltage value V5 that is larger than the first voltage value V1, whereby the shunt pathway 51a is electrically connected and the shunt pathway 51b is electrically connected after starting of the discharge by the discharge switch 30, meaning bypass of at least one of the load devices 41a-41c. Then the intra-terminal current Itt is allowed to flow at lower intra-terminal voltage Vtt, and so the intra-terminal current Itt at the target current value Ita can be discharged at the intra-terminal voltage Vtt in the range narrower than that of the conventional configuration.

The second voltage value V2 and the first current value I1 when the shunt switch 52a is turned on and the third voltage value V3 and the second current value I2 after the shunt switch 52a is turned on as illustrated in FIG. 9 can be changed to be a desired value by adjusting the resistance value of the resistor 53a, the channel length and the channel width of the shunt switch 52a, or the discharge detection switch 55a, for example. The fifth voltage value V5 and the third current value I3 when the shunt switch 52b is turned on and the sixth voltage value V6 and the fourth current value I4 after the shunt switch 52b is turned can be changed to be a desired value by adjusting the resistance value of the resistor 53b, the channel length and the channel width of the shunt switch 52b, or the discharge detection switch 55b, for example.

The present embodiment exemplifies the case where the shunt circuit 50A includes the discharge detection switch 55a and the discharge detection switch 55b in FIG. 8, which is not a limiting example. The protecting circuit 20A may be configured so as to electrically connect the shunt pathway 51a and the shunt pathway 51b after the discharge switch 30 is turned on.

FIG. 10 is a circuit diagram illustrating a second example integrated circuit 100A according to the second embodiment. In the integrated circuit 100A in FIG. 10, like or similar reference numerals designate like or similar parts in the integrated circuit 100A of FIG. 8 unless otherwise stated, and their descriptions are omitted as needed. As illustrated in FIG. 10, the resistor 53a and the resistor 53b are disposed between the first terminal 11 and the discharge detection switch 55a. The resistor 53a has one end connected to the node N5 and the other end connected to the node N3. The resistor 53b has one end connected to the first terminal 11 and the other end connected to the node N5. The node N3 is connected to the gate of the shunt switch 52a. That is, the resistor 53a and the resistor 53b function as a resistor between the gate and the source of the shunt switch 52a. The node N5 is connected to the gate of the shunt switch 52b. That is, the resistor 53b functions as a resistor between the gate and the source of the shunt switch 52b.

The discharge detection switch 55a is disposed between the resistor 53a, the resistor 53b, and the second terminal 12. The discharge detection switch 55a is an n-channel type MOSFET, for example, whose drain is connected to the node N3 and source is connected to the second terminal 12. The gate of the discharge detection switch 55a is connected to the node N1.

The protecting circuit 20A in FIG. 10 is configured so that the discharge detection switch 55a has threshold voltage that is the same as the threshold voltage of the discharge switch 30, for example, whereby the discharge detection switch 55a is turned on in response to turning-on of the discharge switch 30. Adjustment of at least one of the threshold voltage of the shunt switch 52a, the resistance value of the resistor 53a, and the resistance value of the resistor 53b, for example, enables the configuration such that the shunt switch 52a is turned on after the discharge detection switch 55a is turned on and when the intra-terminal voltage Vtt in FIG. 9 increases to be higher than the second voltage value V2. Further, adjustment of at least one of the threshold voltage of the shunt switch 52b and the resistance value of the resistor 53b, for example, enables the configuration such that the shunt switch 52b is turned on after the discharge detection switch 55a is turned on and when the intra-terminal voltage Vtt in FIG. 9 increases again to be higher than the fifth voltage value V5. That is, the protecting circuit 20A in FIG. 10 can be configured to connect the shunt pathway 51a electrically and connect the shunt pathway 51b electrically after the discharge switch 30 is turned on similarly to the example of FIG. 8.

Although not illustrated, the shunt circuit 50A may include three or more shunt pathways.

The thus configured protecting circuit 20A and the integrated circuit 100A of the present embodiment can achieve the similar effects to those of the protecting circuit 20 and the integrated circuit 100 of the first embodiment.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system comprising:
   a protected circuit configured to connect to a first terminal and a second terminal; and
   a protecting circuit, the protecting circuit comprising:
      a discharge switch configured to connect to the first terminal and the second terminal;
      a trigger circuit comprising load devices configured to be connected in series between the first terminal and the second terminal, each of the load devices being configured to consume power; and
      a shunt circuit connected between the trigger circuit and the protected circuit, the shunt circuit comprising a first shunt pathway configured to bypass a first one of the load devices but not a second one of the load devices and a second shunt pathway configured bypass the first one of the load devices and the second one of the load devices;
   wherein the trigger circuit is configured to turn on the discharge switch when a voltage between the first terminal and the second terminal is higher than a first voltage value;
   wherein the shunt circuit is configured to electrically connect the first shunt pathway when the voltage is higher than a second voltage value that is greater than the first voltage value, and wherein the shunt circuit is configured to electrically connect the second shunt pathway when the voltage is higher than a third voltage value that is greater than the first voltage value.

2. The system of claim 1, wherein the shunt circuit is configured to electrically connect the first shunt pathway when the voltage is higher than the second voltage value and a current between the first terminal and the second terminal is greater than a predetermined current value.

3. The system of claim 1, wherein the shunt circuit is configured to electrically disconnect the first shunt pathway when the voltage is lower than or equal to the second voltage value.

4. The system of claim 1, wherein the trigger circuit is configured to turn off the discharge switch when the voltage is lower than or equal to the first voltage value.

5. The system of claim 1, wherein the discharge switch comprises an n-channel type MOSFET.

6. The system of claim 1, wherein the load devices comprise one or more zener diodes.

7. The system of claim 1, wherein the load devices comprise one or more p-channel type MOSFETs.

8. The system of claim 1, wherein the shunt circuit further comprises a shunt switch on the first shunt pathway.

9. The system of claim 1, wherein the protected circuit comprises a plurality of semiconductor devices.

10. The system of claim 1, further comprising a power supply configured to connect to the protected circuit via the first terminal and the second terminal.

11. The system of claim 1, wherein the shunt circuit further comprises a third shunt pathway configured to bypass the first one of the load devices and the second one of the load devices but not a third one of the load devices.

12. A method of protecting a protected circuit against an electrostatic discharge (ESD), the method comprising:
   applying a voltage to the protected circuit that is connected to a first terminal and to a second terminal;
   turning on a discharge switch by a trigger circuit when the voltage between the first terminal and the second terminal becomes higher than a first voltage value, wherein the discharge switch is connected to the first terminal and the second terminal, and wherein the trigger circuit comprises load devices connected in series between the first terminal and the second terminal, each of the load devices being configured to consume power;
   electrically connecting, by a shunt circuit, a first shunt pathway to bypass a first one of the load devices but not a second one of the load devices, when the voltage becomes higher than a second voltage value that is greater than the first voltage value; and
   electrically connecting, by the shunt circuit, a second shunt pathway to bypass the first one of the load devices and the second one of the load devices, when the voltage becomes higher than a third voltage value that is greater than the first voltage value;
   wherein the shunt circuit is connected between the trigger circuit and the protected circuit and comprises the first shunt pathway and the second shunt pathway.

13. The method of claim 12, wherein electrically connecting the first shunt pathway further comprises the shunt circuit electrically connecting the first shunt pathway when the voltage becomes higher than the second voltage value and a current between the first terminal and the second terminal is greater than a predetermined current value.

14. The method of claim 12, further comprising electrically disconnecting, by the shunt circuit, the first shunt pathway when the voltage becomes lower than or equal to the second voltage value.

15. The method of claim 12, further comprising turning off the discharge switch by the trigger circuit when the voltage becomes lower than or equal to the first voltage value.

16. The method of claim 12, wherein the voltage comprises a power supply voltage applied by a power supply to one of the first terminal or the second terminal.

17. A method for the manufacture of a protecting circuit, the method comprising:
provide a discharge switch configured to connect to a first terminal and a second terminal, the first terminal and the second terminal being configured to connect to a protected circuit;
providing a trigger circuit comprising load devices configured to be connected in series between the first terminal and the second terminal, each of the load devices being configured to consume power;
wherein the trigger circuit is configured to turn on the discharge switch when a voltage between the first terminal and the second terminal is higher than a first voltage value; and
providing a shunt circuit connected between the trigger circuit and the protected circuit, the shunt circuit comprising a first shunt pathway configured to bypass a first one of the load devices but not a second one of the load devices and a second shunt pathway configured bypass the first one of the load devices and the second one of the load devices;
wherein the shunt circuit is configured to electrically connect the first shunt pathway when the voltage is higher than a second voltage value that is greater than the first voltage value, and wherein the shunt circuit is configured to electrically connect the second shunt pathway when the voltage is higher than a third voltage value that is greater than the first voltage value.

18. The method of claim 17, wherein the shunt circuit is configured to electrically connect the first shunt pathway when the voltage is higher than the second voltage value and a current between the first terminal and the second terminal is greater than a predetermined current value.

19. The method of claim 17, wherein the shunt circuit is configured to electrically disconnect the first shunt pathway when the voltage is lower than or equal to the second voltage value.

20. The method of claim 17, wherein the trigger circuit is configured to turn off the discharge switch when the voltage is lower than or equal to the first voltage value.

* * * * *